(12) United States Patent
Nakajima et al.

(10) Patent No.: US 7,854,279 B2
(45) Date of Patent: Dec. 21, 2010

(54) DRIVING FORCE CONTROL DEVICE

(75) Inventors: Shigeharu Nakajima, Musashimurayama (JP); Yasushi Fuse, Fujisawa (JP); Izumi Masuda, Kanagawa (JP); Kazuma Kikuchi, Machida (JP)

(73) Assignee: Autech Japan, Inc., Kanagawa (JP)

( * ) Notice: Subject to any disclaimer, the term of this patent is extended or adjusted under 35 U.S.C. 154(b) by 79 days.

(21) Appl. No.: 12/402,938

(22) Filed: Mar. 12, 2009

(65) Prior Publication Data

US 2009/0229904 A1  Sep. 17, 2009

(30) Foreign Application Priority Data

Mar. 14, 2008  (JP) .............................. 2008-066237

(51) Int. Cl.
*B62D 11/02* (2006.01)
*B60K 28/16* (2006.01)

(52) U.S. Cl. .................. 180/6.5; 180/6.44; 180/6.48; 180/6.6; 180/197

(58) Field of Classification Search .................. 180/6.5, 180/6.48, 6.44, 6.6
See application file for complete search history.

(56) References Cited

U.S. PATENT DOCUMENTS 4,837,694 A * 6/1989 Narita et al. .................. 701/70
5,323,866 A * 6/1994 Simard et al. ............... 180/6.28
5,345,155 A * 9/1994 Masaki et al. .......... 318/400.07
5,469,928 A * 11/1995 Adler et al. ................. 180/6.28
6,597,975 B1 * 7/2003 Shinmura et al. ............. 701/48
6,615,937 B2 * 9/2003 Richey et al. ................ 180/6.5
6,625,529 B2 * 9/2003 Obata et al. .................. 701/41
6,728,615 B1 * 4/2004 Yao et al. ..................... 701/41
6,880,654 B2 * 4/2005 Plishner ..................... 180/65.6
7,360,614 B2 * 4/2008 Yokote ...................... 180/6.24
7,565,937 B2 * 7/2009 Deguchi et al. ............ 180/6.28
7,603,221 B2 * 10/2009 Urvoy et al. .................. 701/93

FOREIGN PATENT DOCUMENTS

JP  2006-151290 A  6/2006

* cited by examiner

*Primary Examiner*—Lesley Morris
*Assistant Examiner*—Marlon A Arce
(74) *Attorney, Agent, or Firm*—Global IP Counselors, LLP

(57) ABSTRACT

A driving force control device for an electric vehicle in which a left wheel is driven by a left in-wheel motor and a right wheel is driven by a right in-wheel motor includes a driving force difference setting section. The driving force difference setting section is configured to set a driving force difference between a driving force outputted from the left in-wheel motor and a driving force outputted from the right in-wheel motor when a lateral acceleration is detected acting on the vehicle, the driving force difference being set to generate a restoring moment against the vehicle corresponding to the lateral acceleration.

2 Claims, 4 Drawing Sheets

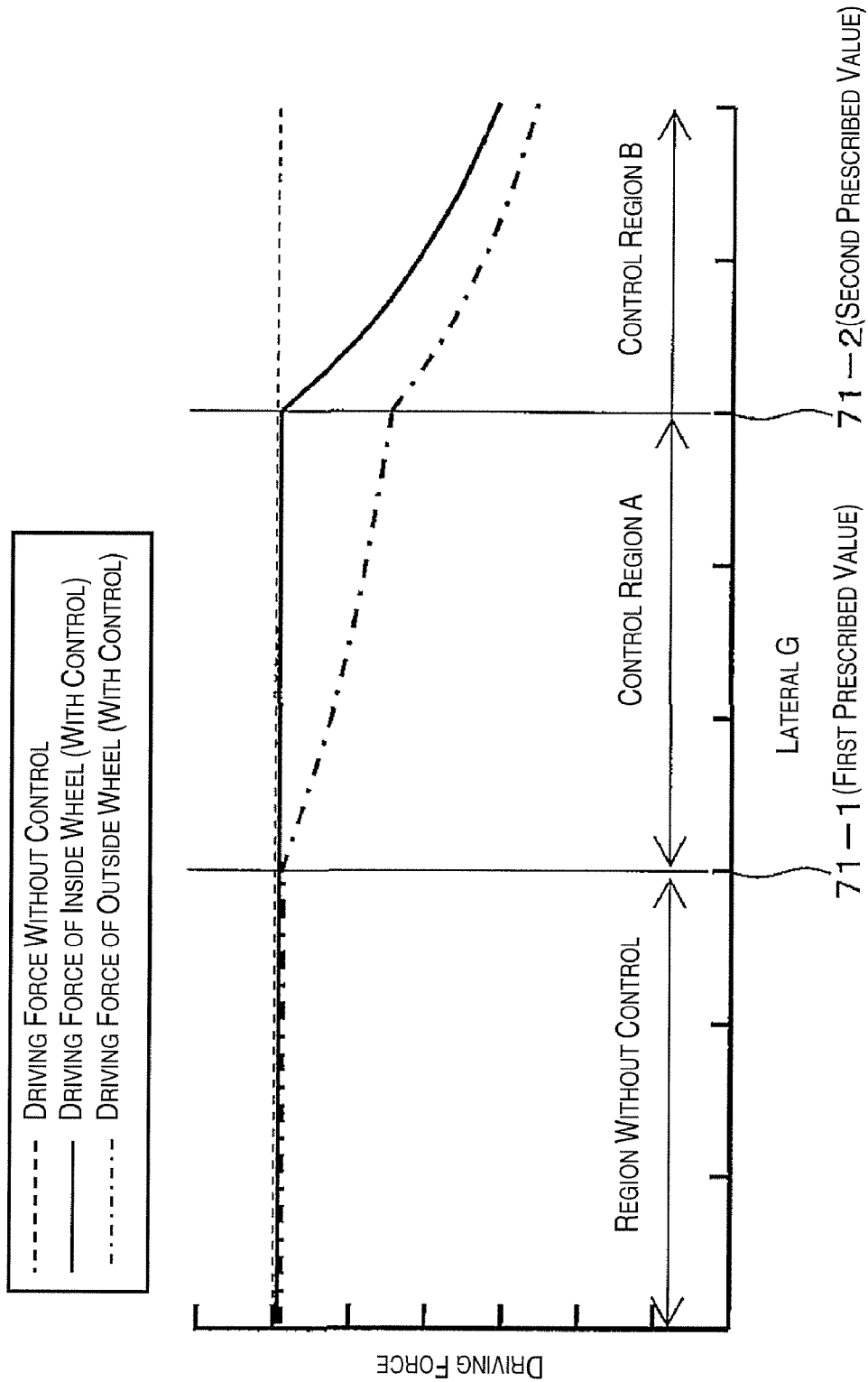
F I G. 2(b)

DRIVING FORCE CONTROL DEVICE

CROSS-REFERENCE TO RELATED APPLICATIONS

This application claims priority to Japanese Patent Application No. 2008-066237, filed on Mar. 14, 2008. The entire disclosure of Japanese Patent Application No. 2008-066237 is hereby incorporated herein by reference.

BACKGROUND OF THE INVENTION

1. Field of the Invention

The present invention relates to a driving force control device configured to control a driving force of an electric vehicle.

2. Background Information

VDC (Vehicle Dynamic Control) and TCS (Traction Control System) are widely known control schemes designed to maintain a driving stability of a car. VDC is configured to control a brake and an engine output in accordance with a sudden operation of a steering wheel so as to prevent wheel slippage, and TCS is configured to lower an engine output when slippage occurs to prevent a wheel from spinning while in a slipping state (spinning without traction). Additionally, an LSD (Limited Slip Differential) is a known technology configured to allow a limited difference between the torques transferred to the drive wheels. When one tire is spinning, the LSD can be controlled so as to suppress the spinning and transmit a driving force to another tire.

Also, Japanese Laid-Open Patent Publication No. 2006-151290 discloses a known technology for preventing a wheel of a two-wheeled vehicle from spinning during cornering.

In view of the above, it will be apparent to those skilled in the art from this disclosure that there exists a need for an improved driving force control device. This invention addresses this need in the art as well as other needs, which will become apparent to those skilled in the art from this disclosure.

SUMMARY OF THE INVENTION

The automobile control methods described above are not necessarily appropriate for a vehicle that is subject to strict regulations, such as a small electric vehicle.

In the case of a small electric vehicle, the category related to the vehicular dimensions (light vehicle regulation category) makes it necessary to seat passengers in an upright state. Since the height of the center of gravity of a moving vehicle is easily affected by the passenger(s), the height of the center of gravity of a moving vehicle tends to be high and there is a need for a technology to stabilize such a vehicle during cornering.

Meanwhile, the two-wheeled vehicle control method described above is configured to prevent wheel spinning by lowering a driving force when spinning is detected during cornering. The driving stability during cornering cannot be increased by employing this technology in an electric vehicle having in-wheel motors.

The present invention was conceived in view of the needs and problems described above and its object is to provide a driving force control device that can improve a driving stability of a small electric vehicle.

In order to achieve the object, a driving force control device according to a first aspect of the present invention is a driving force control device for an electric vehicle in which a left wheel is driven by a left in-wheel motor and a right wheel is driven by a right in-wheel motor, the driving force control device including a driving force difference setting section configured to set a driving force difference between a driving force outputted from the left in-wheel motor and a driving force outputted from the right in-wheel motor when a lateral acceleration acting on the vehicle is detected. The driving force difference is set so as to generate a restoring moment against the vehicle corresponding to the lateral acceleration.

More specifically, when a lateral acceleration is detected while the vehicle is cornering, a control is executed to impose a difference between the driving force delivered from the left in-wheel motor to the left wheel and the driving force delivered from the right in-wheel motor to the right wheel. Since the driving force difference is a difference between driving forces acting on the left and right sides of the vehicle, a restoring moment corresponding to the lateral acceleration can be generated against the vehicle.

As a result, a restoring moment is generated which acts to counteract the effect the lateral acceleration has on the vehicle.

A driving force control device according to a second aspect is provided with a driving force lowering section configured to lower the driving force outputted from the left in-wheel motor and the driving force outputted from the right in-wheel motor when the lateral acceleration exceeds a prescribed value.

More specifically, when a lateral acceleration acting on the vehicle becomes larger than a predetermined prescribed value, a driving force outputted from the left in-wheel motor and a driving force outputted from the right in-wheel motor are lowered.

In this way, the traveling speed of the vehicle (which uses driving forces from the two in-wheel motors as a drive source) is lowered and the centripetal acceleration is prevented from increasing more than necessary.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2(b) is a diagram showing a plot of a driving force versus a lateral acceleration according to the illustrated embodiment.

DETAILED DESCRIPTION OF THE PREFERRED EMBODIMENTS

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
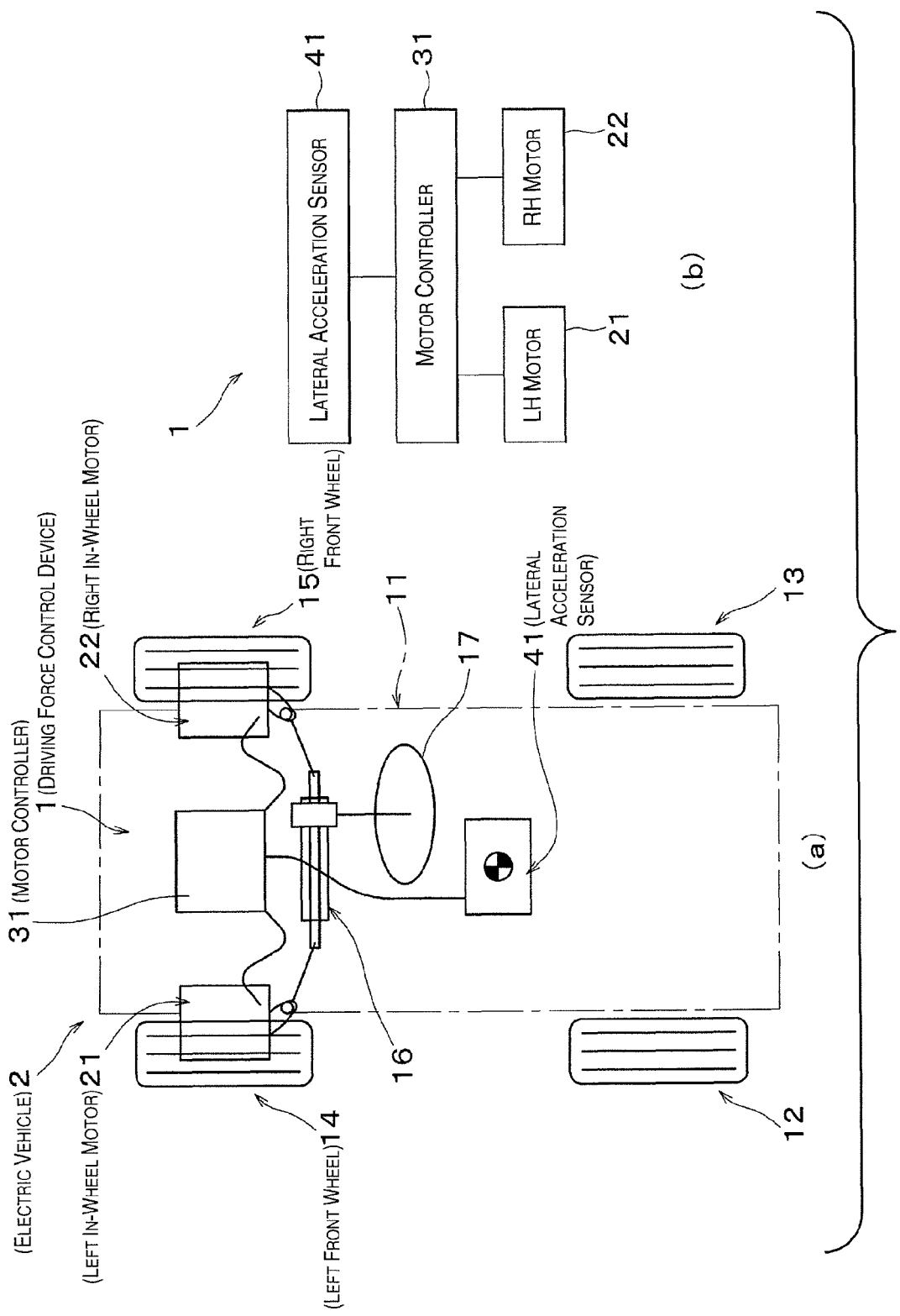
FIG. 1 includes a schematic diagram (a) of an electric vehicle equipped with the driving force control device, and a block diagram (b) of a control system of the driving force control device according to the illustrated embodiment.

FIG. 1 shows a driving force control device 1 in accordance with the embodiment. The driving force control device 1 is installed in a small electric vehicle 2 and serves to execute a drive control of the small electric vehicle 2.

A left rear wheel 12 and a right rear wheel 13 are provided on a rearward portion of a vehicle body 11 of the electric vehicle 2, and a left front wheel 14 and a right front wheel 15 are provided as drive wheels on a frontward portion of the vehicle body 11. The two front wheels 14 and 15 are connected to a steering gear 16 such that a direction thereof can be changed by operating a steering wheel 17.

A left in-wheel motor 21 is provided on the left front wheel 14 such that the left front wheel 14 can be driven by the left in-wheel motor 21. Similarly, a right in-wheel motor 22 is provided on the right front wheel 15 such that the right front wheel 15 can be driven by the right in-wheel motor 22.

The in-wheel motors 21 and 22 are connected to a motor controller 31 (the driving force difference setting section and the driving force lowering section) provided on the vehicle. Each of the in-wheel motors 21 and 22 is independently controlled with a control signal from the motor controller 31.

A lateral acceleration sensor 41 is arranged in an approximate center portion of the vehicle and configured to detect a lateral acceleration (lateral G) acting on the vehicle. The lateral acceleration sensor 41 is connected to the motor controller 31 such that it can feed a detected lateral acceleration to the motor controller 31.

As shown in FIG. 1(b), the motor controller 31 is the central component of the driving force control device 1 and the lateral acceleration sensor 41, the left in-wheel motor 21 and the right in-wheel motor 22 are connected to the motor controller 31. A micro computer is the central component of the motor controller 31 and the microcomputer is configured to execute a program stored in an internal ROM so as to control the operations of the driving force control device 1. The motor controller 31 can also include other conventional components such as an input interface circuit, an output interface circuit, and storage devices such as a RAM (Random Access Memory) device.

Figure 2A:
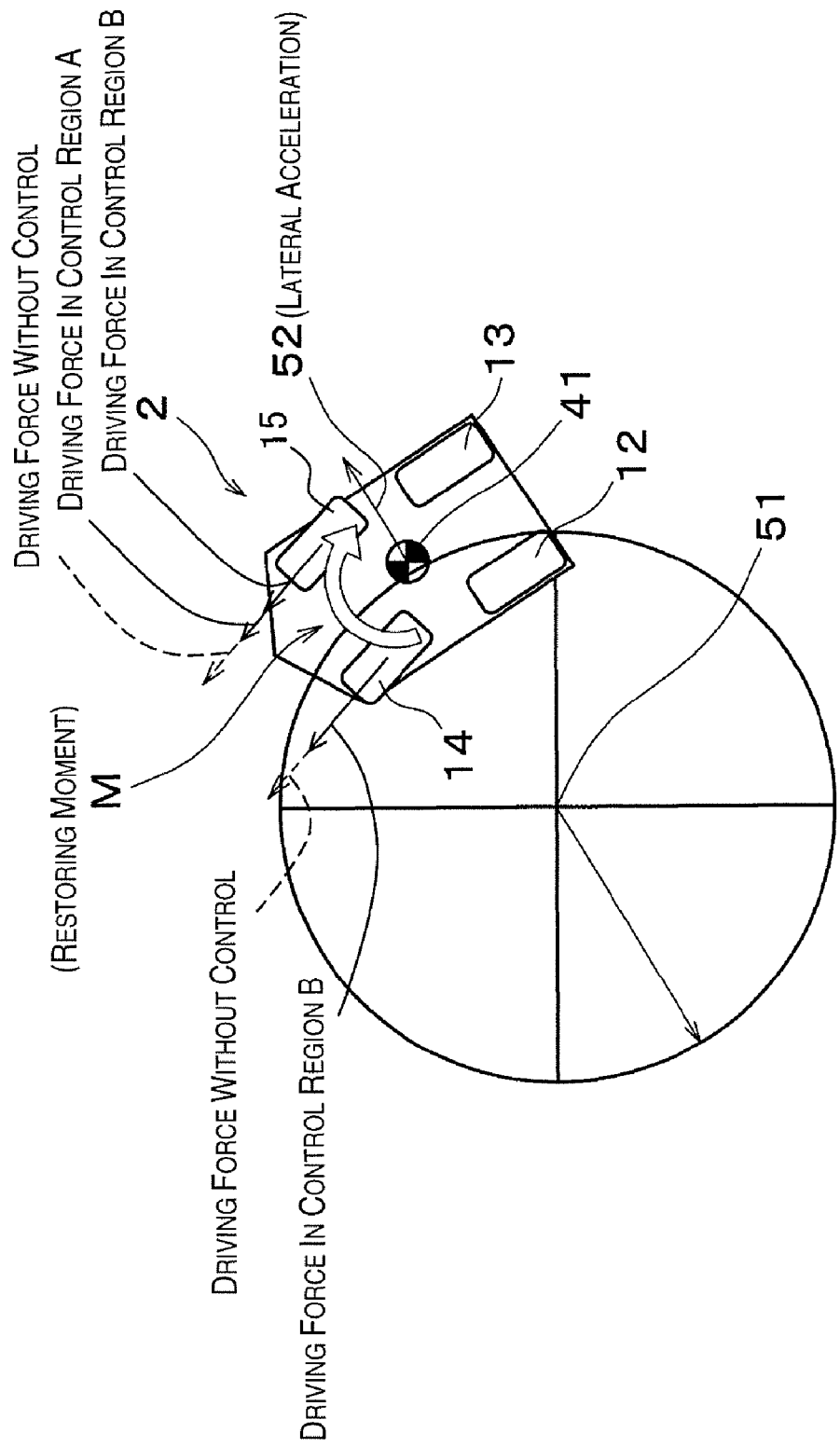
FIG. 2(a) is a schematic diagram illustrating a state in which the electric vehicle is turning left.

FIG. 2 illustrates a state in which the electric vehicle 2 is turning left. When the electric vehicle 2 turns left, a lateral acceleration 52 develops which is oriented away from a turning center 51 of the electric vehicle 2. When this occurs, the lateral acceleration sensor 41 provided on the electric vehicle 2 detects the lateral acceleration 52 and sends the detected lateral acceleration 52 to the motor controller 31.

The motor controller 31 receives the lateral acceleration 52 and controls the in-wheel motors 21 and 22 so as to generate a restitutive or restoring moment M against the vehicle corresponding to the lateral acceleration 52. More specifically, the motor controller 31 creates a driving force difference corresponding to the lateral acceleration 52 between the driving force outputted from the left in-wheel motor 21 and the driving force outputted from the right in-wheel motor 22.

The motor controller 31 is further configured to execute a control to lower the driving force outputted from the left in-wheel motor 21 and the driving force outputted from the right in-wheel motor 22 when the lateral acceleration 52 exceeds a first prescribed value 71-1 or a second prescribed value 71-2 determined in advance.

The operation of the embodiment will now be explained with reference to the flowchart shown in FIG. 3.

Figure 3:
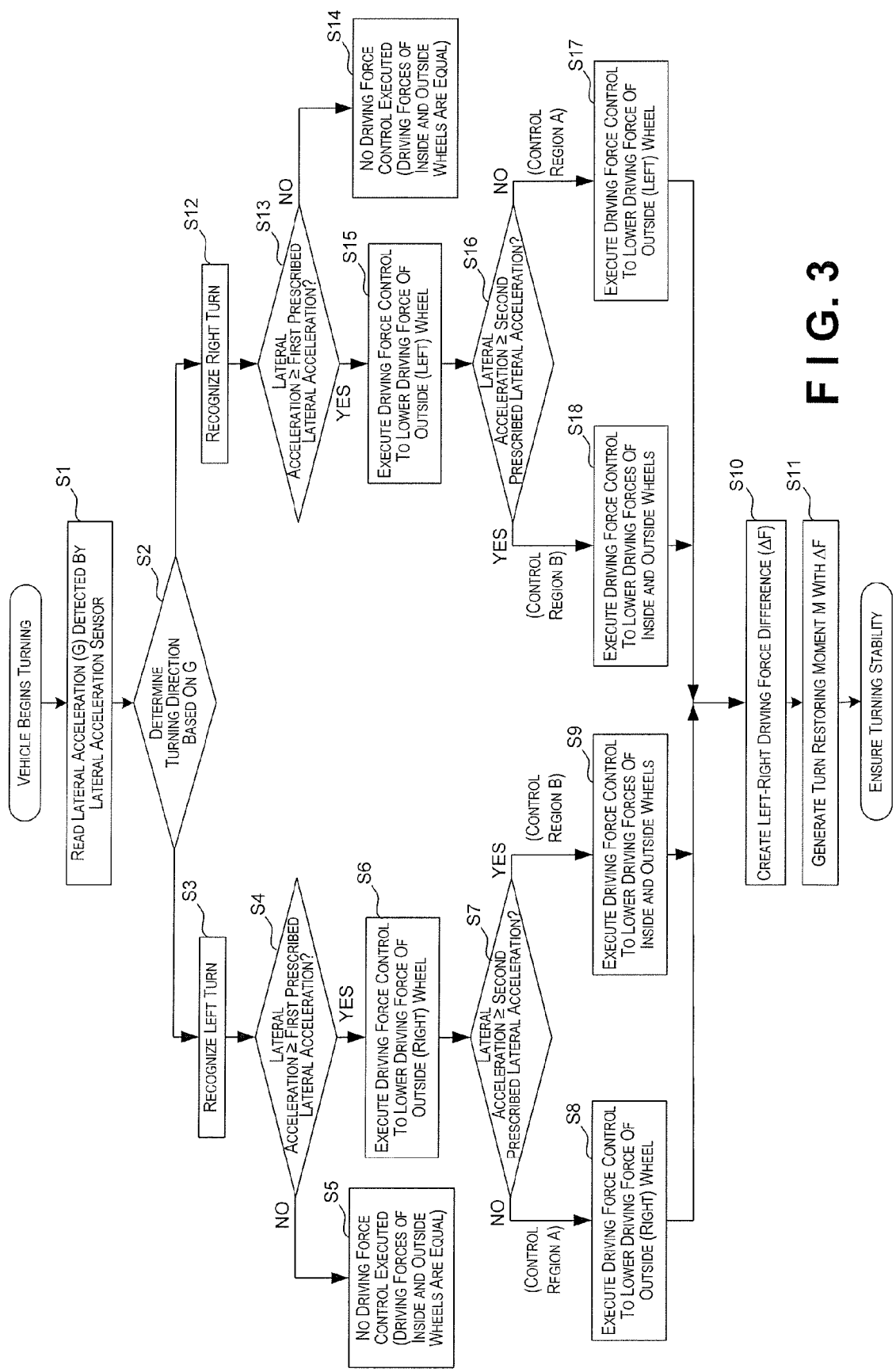
FIG. 3 is a flowchart explaining the operation of the driving force control device according to the illustrated embodiment.

More specifically, when the vehicle starts to turn while the microcomputer of the motor controller 31 is executing a program stored in the ROM, the subroutine shown in FIG. 3 is called from a main routine.

The motor controller 31 receives the lateral acceleration 52 from the lateral acceleration sensor 41 (S1) and recognizes the turning direction of the vehicle based on the direction of the lateral acceleration 52.

If the motor controller 31 determines that the vehicle is turning left (S3), then it compares the received lateral acceleration 52 to the first prescribed value 71-1 stored, for example, in the ROM of the microcomputer in advance. The motor controller 31 then determines if the lateral acceleration 52 is equal to or larger than a prescribed lateral acceleration, i.e., exceeds the first prescribed value 71-1 (S4).

If it determines that the lateral acceleration 52 is smaller than the first prescribed value 71-1, then the driving force control for producing a left-right driving force difference is not executed. Thus, the motor controller 31 sets a supply current target value constituting a target value of an electric current supplied to the right in-wheel motor 22 and a supply current target value constituting a target value of an electric current supplied to the left in-wheel motor 21 to the same value (S5). On the other hand, if it determines that the lateral acceleration 52 is equal to or larger than the first prescribed value 71-1, then the motor controller 31 lowers a supply current target value constituting a target value of an electric current supplied to the right in-wheel motor 22, which corresponds to the outside wheel in the case of a left turn. By lowering the supply current target value, the motor controller 31 reduces the electric current supplied to the right in-wheel motor 22 and lowers the driving force outputted from the right in-wheel motor 22 (S6).

In the electric vehicle 2 of this embodiment, the supply current target value of the left in-wheel motor 21 and the supply current target value of the right in-wheel motor 22 are calculated based on an accelerator pedal depression amount.

As shown in FIG. 2(b), when a control according to this embodiment is not executed (i.e., the region without control), the driving force of the right in-wheel motor 22 (outside wheel) is equal to the driving force of the left in-wheel motor 21 (inside wheel).

When the control according to this embodiment is executed in the control region A, the supply current target value of the right in-wheel motor 22 (outside wheel) becomes smaller than the supply current target value of the left in-wheel motor 21 (inside wheel) and the driving force outputted from the right in-wheel motor 22 becomes smaller than the driving force outputted from the left in-wheel motor 21. As a result, a driving force oriented in the rectilinear travel direction can be imparted to the vehicle.

In step S7, if the motor controller 31 determines that the received lateral acceleration 52 is smaller than a second prescribed value 71-2, which is larger than the first prescribed value 71-1, then it decreases the driving force outputted from the right in-wheel motor 22 (outside wheel) as in step S6 by lowering the supply current target value of the right in-wheel motor 22 so as to reduce the electric current supplied to the right in-wheel motor 22 (S8). On the other hand, if the lateral acceleration 52 is equal to or larger than the second prescribed value 71-2, then the motor controller 31 lowers both the supply current target value of the right in-wheel motor 22 (outside wheel) and the supply current target value of the left in-wheel motor 21 (inside wheel) (S9), thereby reducing the electric currents supplied to both of the in-wheel motors 21 and 22. In such a case, the supply current target value of the right in-wheel motor 22 and the supply current target value of the left in-wheel motor 21 are set such that the driving force of the right in-wheel motor 22 is smaller than the driving force of the left in-wheel motor 21.

Thus, a driving force oriented in the direction of travel can be imparted to the vehicle by setting the supply current target value of the right in-wheel motor 22 (outside wheel) to be smaller than the supply current target value of the left in-wheel motor 21 (inside wheel) such that the driving force outputted from the right in-wheel motor 22 (outside wheel) becomes smaller than the driving force outputted from the left in-wheel motor 21 (inside wheel), as illustrated on the control region B of FIG. 2(*b*).

At the same time, by reducing the electric current supplied to both of the in-wheel motors 21 and 22, the traveling speed of the electric vehicle 2 can be decreased.

More specifically, a left-right driving force difference ΔF is created between the left front wheel 14 driven by the left in-wheel motor 21 and the right front wheel 15 driven by the right in-wheel motor 22 (S10) and the left-right driving force difference ΔF generates the aforementioned turn restoring moment M (S11). The motor controller 31 then returns to the main routine.

Although the embodiment has been explained using an example in which the motor controller 31 proceeds from step S9 to step S10, it is also possible for the motor controller 31 to proceed from step S9 to step S7. With such a control arrangement, step S9 can be repeated until the received lateral acceleration 52 is less than the prescribed lateral acceleration, i.e., equal to or smaller than the second prescribed value 71-2. This enables the lateral acceleration 52 to be decreased to or below the second prescribed value 71-2 with more certainty.

When the motor controller 31 determines the turning direction of the vehicle based on the direction of the lateral acceleration 52 (S2) and recognizes that the vehicle is turning right (S12), then it compares the received lateral acceleration 52 to the first prescribed value 71-1 stored in the ROM in advance and determines if the lateral acceleration 52 is equal to or larger than a prescribed lateral acceleration, i.e., exceeds the first prescribed value 71-1 (S13).

If it determines that the lateral acceleration 52 is smaller than the first prescribed value 71-1, then the driving force control for producing a left-right driving force difference is not executed. Thus, the motor controller 31 sets a supply current target value constituting a target value of an electric current supplied to the right in-wheel motor 22 and a supply current target value constituting a target value of an electric current supplied to the left in-wheel motor 21 to the same value (S14). On the other hand, if it determines that the lateral acceleration 52 is equal to or larger than the first prescribed value 71-1, then the motor controller 31 lowers a supply current target value constituting a target value of an electric current supplied to the left in-wheel motor 21, which corresponds to the outside wheel in the case of a right turn. By lowering the supply current target value, the motor controller 31 reduces the electric current supplied to the left in-wheel motor 21 and lowers the driving force outputted from the left in-wheel motor 21 (S15).

As shown in FIG. 2(*b*), when a control according to this embodiment is not executed (i.e., the region without control), the driving force of the left in-wheel motor 21 (outside wheel) is equal to the driving force of the right in-wheel motor 22 (inside wheel).

When the control according to this embodiment is executed in the control region A, the supply current target value of the left in-wheel motor 21 (outside wheel) becomes smaller than the supply current target value of the right in-wheel motor 22 (inside wheel) and the driving force outputted from the left in-wheel motor 21 becomes smaller than the driving force outputted from the right in-wheel motor 22. As a result, a driving force oriented in the direction of travel can be imparted to the vehicle.

In step S16, if the motor controller 31 determines that the received lateral acceleration 52 is smaller than the second prescribed value 71-2, then it decreases the driving force outputted from the left in-wheel motor 21 (outside wheel) as in step S15 by lowering the supply current target value of the left in-wheel motor 21 so as to reduce the electric current supplied to the left in-wheel motor 21 (S17). On the other hand, if the lateral acceleration 52 is equal to or larger than the second prescribed value 71-2, then the motor controller 31 lowers both the supply current target value of the right in-wheel motor 22 (inside wheel) and the supply current target value of the left in-wheel motor 21 (outside wheel) (S18), thereby reducing the electric currents supplied to both of the in-wheel motors 21 and 22. In such a case, the supply current target value of the left in-wheel motor 21 and the supply current target value of the right in-wheel motor 22 are set such that the driving force of the left in-wheel motor 21 is smaller than the driving force of the right in-wheel motor 22.

Thus, a driving force oriented in the direction of travel can be imparted to the vehicle by setting the supply current target value of the left in-wheel motor 21 (outside wheel) to be smaller than the supply current target value of the right in-wheel motor 22 (inside wheel) such that the driving force outputted from the left in-wheel motor 21 (outside wheel) becomes smaller than the driving force outputted from the right in-wheel motor 22 (inside wheel), as illustrated on the control region B of FIG. 2(*b*).

At the same time, by reducing the electric current supplied to both of the in-wheel motors 21 and 22, the traveling speed of the electric vehicle 2 can be decreased.

More specifically, a left-right driving force difference ΔF is created between the left front wheel 14 driven by the left in-wheel motor 21 and the right front wheel 15 driven by the right in-wheel motor 22 (S10) and the left-right driving force difference ΔF generates the aforementioned turn restoring moment M (S11). The motor controller 31 then returns to the main routine.

Although the embodiment has been explained using an example in which the motor controller 31 proceeds from step S18 to step S10, it is also possible for the motor controller 31 to proceed from step S18 to step S16. With such a control arrangement, step S18 can be repeated until the received lateral acceleration 52 is less than the prescribed lateral acceleration, i.e., equal to or smaller than the second prescribed value 71-2. This enables the lateral acceleration 52 to be decreased to or below the second prescribed value 71-2 with more certainty.

As described above, when a lateral acceleration 52 is detected during cornering, a left-right driving force difference ΔF can be created between the driving force outputted from the left in-wheel motor 21 to the left front wheel 14 (left drive wheel) and the driving force outputted from the right in-wheel motor 22 to the right front wheel 15 (right drive wheel). By creating a difference ΔF between a driving force acting on the left side and a driving force acting on the right side of the vehicle, a corresponding restoring moment M can be imposed against the vehicle and the restoring moment M generated against the vehicle can be used to counteract the effect of the lateral acceleration 52.

Small electric vehicles are at a disadvantage with respect to driving stability because the center of gravity thereof is high and because of strict restrictions regarding thread width. With this embodiment, the driving stability of even a small electric vehicle 2 can be greatly improved and an outward force generated during high-G turning can be reduced.

Thus, with this embodiment, a driving stability improvement suited to a small electric vehicle 2 can be achieved.

Additionally, when the lateral acceleration 52 exceeds the second prescribed value 71-2, both the driving force of the left in-wheel motor 21 and the driving force of the right in-wheel motor 22 can be decreased.

In this way, the traveling speed of the electric vehicle 2 (which moves using the driving forces of the two in-wheel motors 21 and 22 as a drive source) can be decreased and the centripetal acceleration can be prevented from increasing more than necessary. As a result, the vehicle can be prevented from experiencing a turning centripetal force larger than the vehicle was designed for.

In the above illustrated embodiment, the supply current target values of the outside and inside in-wheel motors are set to be the same value when the driving force control for creating a left-right driving force difference is not executed. Alternatively, during a turn, in order to accomplish the turn more easily, the supply current target value of the outside in-wheel motor may be set to be higher than the supply current target value of the inside in-wheel motor when the driving force control for creating a left-right driving force difference is not executed.

As explained previously, with a driving force control device according to the illustrated embodiment, when a lateral acceleration is detected, a control is executed to impose a difference between the driving force delivered from the left in-wheel motor to the left wheel and the driving force delivered from the right in-wheel motor to the right wheel. This driving force difference causes a restoring moment to act on the vehicle in such a direction as to counteract the effect of the lateral acceleration.

As a result, the driving stability of even a small electric vehicle can be greatly improved (small electric vehicles are at a disadvantage with respect to driving stability because the center of gravity thereof is high and because of strict restrictions regarding thread width). Additionally, an outward force generated during high-G turning can be reduced.

Thus, a driving stability improvement suited to a small electric vehicle can be achieved.

With a driving force control device according to the illustrated embodiment, a driving force outputted from the left in-wheel motor and a driving force outputted from the right in-wheel motor can be lowered when a lateral acceleration acting on the vehicle exceeds a prescribed value.

In this way, the traveling speed of the vehicle (which uses driving forces from the two in-wheel motors as a drive source) is lowered and the centripetal acceleration can be prevented from increasing more than necessary. As a result, the vehicle can be prevented from experiencing a turning centripetal force larger than the vehicle was designed for.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of an electric vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A driving force control device for an electric vehicle in which a left wheel is driven by a left in-wheel motor and a right wheel is driven by a right in-wheel motor, the driving force control device comprising:

a driving force difference setting section configured to set a driving force difference between a driving force outputted from the left in-wheel motor and a driving force outputted from the right in-wheel motor when a lateral acceleration is detected acting on the vehicle, the driving force difference being set to generate a restoring moment against the vehicle corresponding to the lateral acceleration, the driving force difference setting section being configured to determine a turning direction of the vehicle based on a direction of the lateral acceleration; and a driving force lowering section configured to lower the driving force outputted from one of the left in-wheel motor and the right in-wheel motor disposed on an outer side with respect to the turning direction when the lateral acceleration exceeds a first prescribed value, and to lower the driving force outputted from both the left in-wheel motor and the right in-wheel motor when the lateral acceleration exceeds a second prescribed value that is greater than the first prescribed value.

2. The driving force control device recited in claim 1, wherein the driving force difference setting section is configured to set the driving force difference such that the driving force outputted from one of the left in-wheel motor and the right in-wheel motor disposed on an outer side with respect to the turning direction is smaller than the driving force outputted from the other of the left in-wheel motor and the right in-wheel motor disposed on an inner side with respect to the turning direction.

* * * * *